US009689315B2

(12) United States Patent
Marocchini et al.

(10) Patent No.: US 9,689,315 B2
(45) Date of Patent: Jun. 27, 2017

(54) FULL-AREA BLEED VALVES

(71) Applicant: Hamilton Sundstrand Corporation, Charlotte, NC (US)

(72) Inventors: Francis P. Marocchini, Somers, CT (US); Aaron F. Rickis, Feeding Hills, MA (US); Glenn Gradischer, Canton, CT (US); Robert Goodman, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 62 days.

(21) Appl. No.: 14/622,521

(22) Filed: Feb. 13, 2015

(65) Prior Publication Data
US 2016/0237913 A1 Aug. 18, 2016

(51) Int. Cl.
*F02C 9/18* (2006.01)
*F16K 31/122* (2006.01)
(Continued)

(52) U.S. Cl.
CPC .............. *F02C 9/18* (2013.01); *F01D 17/105* (2013.01); *F01D 17/26* (2013.01); *F04D 27/023* (2013.01);
(Continued)

(58) Field of Classification Search
CPC ...... F02C 9/18; F02C 9/16; F02C 9/00; F02C 6/06; F02C 6/08; F02C 9/20; F04D 27/0215; F04D 27/023; F04D 27/0207; F04D 27/02; F16K 31/122; F16K 31/12; F16K 31/1221; F16K 31/1223; F16K 31/1225; F16K 31/1226; F16K 31/1228;
(Continued)

(56) References Cited

U.S. PATENT DOCUMENTS

| 1,524,400 A | * | 1/1925 | Larner | ................... F16K 1/126 137/222 |
| 1,750,417 A | * | 3/1930 | McClellan | .............. F16K 1/126 137/219 |

(Continued)

OTHER PUBLICATIONS

Extended European Search Report dated Jul. 14, 2016, issued during the prosecution of corresponding European Patent Application No. EP 16155234.4.

Primary Examiner — Kevin Murphy
Assistant Examiner — David Colon Morales
(74) *Attorney, Agent, or Firm* — Locke Lord LLP; Scott D. Wofsy; Alicia J. Carroll

(57) ABSTRACT

A bleed valve includes inlet and outlet housings, a hollow shaft defining a valve axis, and a full-area piston. The shaft includes a first end mounted to an inner diameter portion of the inlet housing and a second end mounted to an end cap of the outlet housing. The piston is slidably mounted to the shaft. A first chamber is defined between an upstream side of the piston and the inner diameter portion of the inlet housing. A second chamber is defined between a downstream side of the piston and the end cap of the outlet housing. An area of an upstream surface of the piston at an angle with respect to the valve axis is in fluid communication with the first chamber, and is substantially equal to an area of a downstream surface of the piston at an angle with respect to the valve axis and in fluid communication with the second chamber.

17 Claims, 3 Drawing Sheets

(51) Int. Cl.
| | | |
|---|---|---|
| *F16K 1/12* | (2006.01) | |
| *F01D 17/10* | (2006.01) | |
| *F01D 17/26* | (2006.01) | |
| *F04D 27/02* | (2006.01) | |
| *F16K 3/02* | (2006.01) | |
| *F16K 31/06* | (2006.01) | |

(52) U.S. Cl.
CPC .......... *F04D 27/0215* (2013.01); *F16K 1/126* (2013.01); *F16K 3/0218* (2013.01); *F16K 3/0254* (2013.01); *F16K 31/0668* (2013.01); *F16K 31/122* (2013.01); *Y10T 137/3367* (2015.04)

(58) Field of Classification Search
CPC .... F16K 31/124; F16K 31/1245; F16K 1/126; F16K 1/123; F16K 1/12; Y10T 137/3421; Y10T 137/3367
USPC ................ 251/281, 282; 60/784, 785, 806
See application file for complete search history.

(56) References Cited

U.S. PATENT DOCUMENTS

| | | | | |
|---|---|---|---|---|
| 2,297,082 A * | 9/1942 | Staats | F16K 1/12 | 137/219 |
| 2,919,714 A * | 1/1960 | Mrazek | F16K 1/126 | 137/220 |
| 2,950,732 A * | 8/1960 | Lambert | F16K 1/126 | 137/219 |
| 3,076,471 A * | 2/1963 | Salerno | G05D 7/014 | 137/219 |
| 3,092,132 A * | 6/1963 | Guy | F16K 1/12 | 137/219 |
| 3,124,115 A * | 3/1964 | Voorhies | F01L 1/245 | 123/54.2 |
| 3,155,108 A * | 11/1964 | Kahn | B64D 13/02 | 137/220 |
| 3,156,253 A * | 11/1964 | Marderness | F16K 1/126 | 137/220 |
| 3,172,420 A * | 3/1965 | Brown | B64D 37/20 | 137/110 |
| 3,198,204 A * | 8/1965 | Parks | F16K 1/126 | 137/219 |
| 3,297,047 A * | 1/1967 | Sime | F16K 1/126 | 137/220 |
| 3,307,786 A * | 3/1967 | Salerno | F16K 1/126 | 137/489.5 |
| 3,338,259 A * | 8/1967 | Tribe | F16K 1/126 | 137/220 |
| 3,350,054 A * | 10/1967 | Wray | B64C 29/0091 | 251/29 |
| 3,380,469 A * | 4/1968 | Salerno | B64D 13/02 | 137/219 |
| 3,415,269 A * | 12/1968 | Salerno | F16K 1/126 | 137/219 |
| 3,515,165 A * | 6/1970 | Zadoo | G05D 16/106 | 137/220 |
| 3,521,661 A * | 7/1970 | Staiger | F04D 27/0215 | 137/220 |
| 3,533,434 A * | 10/1970 | Smith | F16K 1/126 | 137/220 |
| 3,540,464 A * | 11/1970 | Renzi | F02C 7/047 | 137/221 |
| 3,566,907 A * | 3/1971 | Sime | F16K 1/126 | 137/219 |
| 3,586,033 A * | 6/1971 | Hieber | B64D 39/06 | 137/220 |
| 3,586,458 A * | 6/1971 | Avery | F04D 27/0207 | 415/28 |
| 3,632,223 A * | 1/1972 | Hampton | F04D 29/522 | 415/144 |
| 3,655,134 A * | 4/1972 | Greenland | F02K 1/76 | 239/265.37 |
| 3,734,120 A * | 5/1973 | Rowe | G05D 16/106 | 137/220 |
| 3,777,489 A * | 12/1973 | Johnson | F01D 9/065 | 415/144 |
| 3,792,713 A * | 2/1974 | Zadoo | F16K 1/126 | 137/220 |
| 3,792,716 A * | 2/1974 | Sime | F16K 1/126 | 137/220 |
| 3,818,921 A * | 6/1974 | Peczkowski | G05D 16/10 | 137/501 |
| 3,825,026 A * | 7/1974 | Salerno | F01D 17/145 | 137/219 |
| 3,849,020 A * | 11/1974 | Eastman | F04D 27/023 | 2/909 |
| 3,865,128 A * | 2/1975 | Zadoo | G05D 16/106 | 137/220 |
| 3,915,587 A * | 10/1975 | Rannenberg | F04D 27/0215 | 137/484 |
| 3,945,759 A * | 3/1976 | Bobo | F04D 27/0215 | 415/145 |
| 4,060,453 A * | 11/1977 | Schabert | F16K 17/10 | 137/599.16 |
| 4,280,678 A * | 7/1981 | Roberts | F04D 27/0215 | 251/155 |
| 4,373,544 A * | 2/1983 | Goodman | F04D 27/0215 | 137/220 |
| 4,610,265 A | 9/1986 | Nelson | | |
| 4,640,091 A * | 2/1987 | Blizzard | F01D 17/105 | 60/795 |
| 5,174,545 A * | 12/1992 | Blais | F04D 27/0215 | 251/33 |
| 5,435,336 A * | 7/1995 | Serot | F16K 39/022 | 137/219 |
| 5,487,527 A * | 1/1996 | Eggleston | F16K 31/1228 | 251/285 |
| 5,540,252 A * | 7/1996 | Bruun | G05D 7/0146 | 137/220 |
| 6,029,691 A * | 2/2000 | Tavor | F16K 1/12 | 137/219 |
| 6,446,657 B1 | 9/2002 | Dziorny et al. | | |
| 6,742,539 B2 * | 6/2004 | Lyons | F16K 1/126 | 137/219 |
| 6,752,168 B1 * | 6/2004 | Ottestad | F04D 15/0022 | 137/220 |
| 6,981,842 B2 | 1/2006 | D'Angelo et al. | | |
| 7,108,241 B2 * | 9/2006 | Yoshino | F16K 31/1221 | 251/335.2 |
| 7,387,489 B2 * | 6/2008 | Appleby | F01D 17/105 | 415/121.2 |
| 7,434,405 B2 * | 10/2008 | Gukeisen | F02C 9/18 | 251/129.11 |
| 2009/0078828 A1 * | 3/2009 | Sugai | B23K 1/0008 | 244/134 B |
| 2009/0266428 A1 * | 10/2009 | Yoshino | F16K 7/06 | 137/551 |
| 2010/0107594 A1 * | 5/2010 | Coffinberry | F02C 6/08 | 60/39.093 |
| 2012/0043486 A1 * | 2/2012 | Bouten | F15B 13/0402 | 251/129.15 |
| 2012/0045317 A1 * | 2/2012 | Saladino | F02C 6/08 | 415/145 |
| 2012/0061595 A1 * | 3/2012 | Canjuga | F16K 1/126 | 251/62 |
| 2012/0180501 A1 * | 7/2012 | Army | B64D 13/08 | 60/796 |
| 2013/0104516 A1 * | 5/2013 | Varillas | F02C 9/18 | 60/39.24 |
| 2013/0187007 A1 * | 7/2013 | Mackin | F02C 6/08 | 244/134 R |

* cited by examiner

FULL-AREA BLEED VALVES

BACKGROUND OF THE INVENTION

1. Field of the Invention

The present disclosure relates to valves, and more particularly to valves used in bleed systems such as those used in gas turbine engines.

2. Description of Related Art

A variety of devices require a substantially constant supply of pressurized fluid in order to function properly. For example, secondary aircraft systems such as environmental control or anti-ice systems often require an input supply of constant pressure gas. Sources of pressurized gas, for example, are present in the compressor of gas turbine engine. If the pressure in one of the sources, e.g. an intermediate-pressure bleed port, is too low for the secondary aircraft system, high-pressure bleed fluid from a high-pressure compressor stage is utilized.

A pressure regulating bleed valve can be used to regulate pressure from the sources as needed to output the constant pressure to the secondary system. Such conventional methods and systems have generally been considered satisfactory for their intended purpose. However, there is still a need in the art for improved high-pressure bleed valves. The present disclosure provides a solution for this need.

SUMMARY OF THE INVENTION

A bleed valve for a turbomachine includes an inlet housing, an outlet housing downstream of the inlet housing and a hollow shaft defining a valve axis. The hollow shaft includes a first end mounted to an inner diameter portion of the inlet housing and a second end mounted to an end cap of the outlet housing. The bleed valve also includes a full-area piston slidably mounted to the shaft between the inlet housing and the end cap for movement between an open and a closed position. A first pressure chamber is defined between an upstream side of the piston and the inner diameter portion of the inlet housing and is in fluid communication with an intermediate-pressure port. A second pressure chamber is defined between a downstream side of the piston and the end cap and is in fluid communication with a solenoid pressure port. An area of an upstream surface of the piston is at an angle with respect to the valve axis, in fluid communication with the first pressure chamber, and is substantially equal to an area of a downstream surface of the piston. The downstream surface of the piston is at an angle with respect to the valve axis and is in fluid communication with the second pressure chamber.

The intermediate-pressure port can be configured to connect to an intermediate-pressure source. The solenoid pressure port can be configured to connect to a solenoid pressure valve that controls the pressure in the second pressure chamber. An intermediate pressure of the first pressure chamber can be for driving the piston into the closed position and a solenoid pressure of the second pressure chamber can be for driving the piston into the open position. The piston can include inner and outer sleeves, and a conical portion connecting therebetween. The conical portion can converge in a downstream direction. The outer sleeve of the piston can include a high-pressure seal ring at an interface between an outer diameter surface of the outer sleeve of the piston and an inner diameter surface of the inlet housing.

The end cap can include a seal ring at an interface between an outer diameter surface of the end cap and an inner diameter surface of the outer sleeve of the piston. The valve can also include spring positioned in an interior of the first pressure chamber. In an open position, a conical end portion of the outer sleeve of the piston can form a substantially conical surface in conjunction with the end cap. A downstream side of an inner diameter portion of the inlet housing can be proximate to an upstream side of the end cap.

In accordance with certain embodiments, a high-pressure bleed valve system for a gas turbine engine includes a valve mounted within a high-pressure bleed duct of a gas turbine engine. The valve includes an intermediate-pressure chamber, e.g. the first pressure chamber, and a solenoid pressure chamber, e.g. the second pressure chamber. The system includes a solenoid pressure valve and an intermediate-pressure source. The solenoid pressure valve is in fluid communication with the solenoid pressure chamber for controlling the pressure in the solenoid pressure chamber. The intermediate-pressure source is in fluid communication with the intermediate-pressure chamber. The intermediate pressure of the intermediate-pressure chamber is for driving a piston of the valve into a closed position and the solenoid pressure of the solenoid pressure chamber is for driving the piston into an open position.

The intermediate-pressure source can be an intermediate stage of the compressor, e.g. a stage in the low-pressure compressor. The valve can include an inlet housing and an outlet housing. A downstream side of an inner diameter portion of the inlet housing can be proximate to an upstream side of an end cap of the outlet housing.

In accordance with certain embodiments, a method for controlling pressure within a gas turbine compressor stage includes moving a piston into an open position such that high-pressure fluid is free to flow through a housing body and supplying intermediate-pressure fluid to a first fluid chamber. The first fluid chamber is in fluid communication with an upstream surface of the piston, thereby moving said piston into a closed position. The method includes supplying fluid pressure from a solenoid pressure valve into a second fluid chamber in fluid communication with a downstream surface of the piston, thereby moving said piston into an open position. The method includes passing high-pressure fluid through the housing body while the piston is in the open position for a desired time and removing fluid pressure from the second fluid chamber, thereby allowing the piston to return to the closed position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
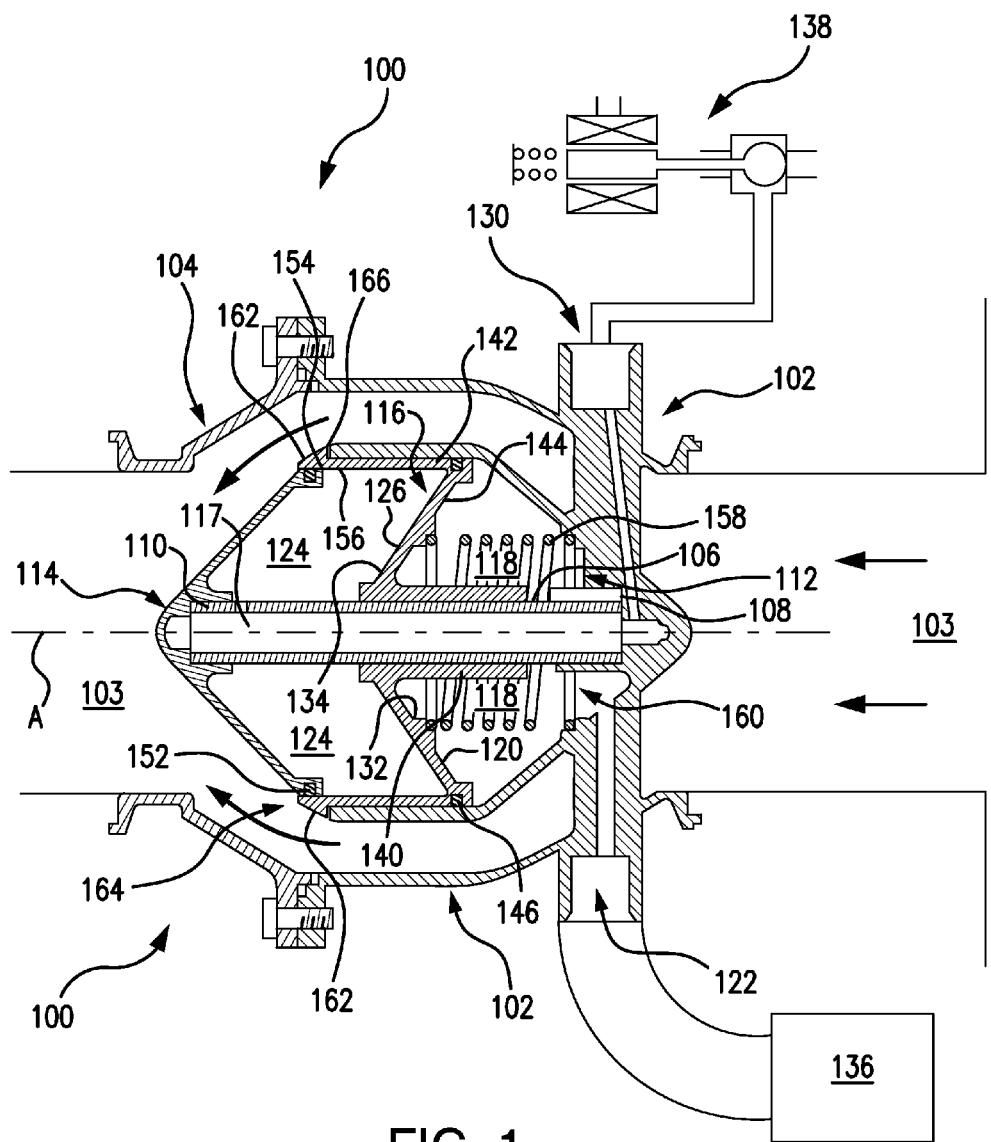
FIG. 1 is a partial cross-sectional side elevation view of an exemplary embodiment of a bleed valve constructed in accordance with the present disclosure, showing the full-area piston in an open position.

Reference will now be made to the drawings wherein like reference numerals identify similar structural features or aspects of the subject disclosure. For purposes of explanation and illustration, and not limitation, a partial view of an exemplary embodiment of a bleed valve constructed in accordance with the disclosure is shown in FIG. 1 and is designated generally by reference character 100. Other embodiments of bleed valves in accordance with this disclosure, or aspects thereof, are provided in FIGS. 2 and 3, as will be described.

As shown in FIG. 1, a bleed valve 100 for a turbomachine includes an inlet housing 102, an outlet housing 104 downstream of inlet housing 102 and a hollow shaft 106 defining a valve axis A. Hollow shaft 106 includes a first end 108 mounted to an inner diameter portion 112 of inlet housing 102 and a second end 110 mounted to an end cap 114 of outlet housing 104. Bleed valve 100 also includes a full-area piston 116 slidably mounted to shaft 106 between an inner diameter portion 112 of inlet housing 102 and end cap 114, for movement between an open position, schematically shown in FIG. 1, and a closed position, schematically shown in FIG. 2.

Figure 2:
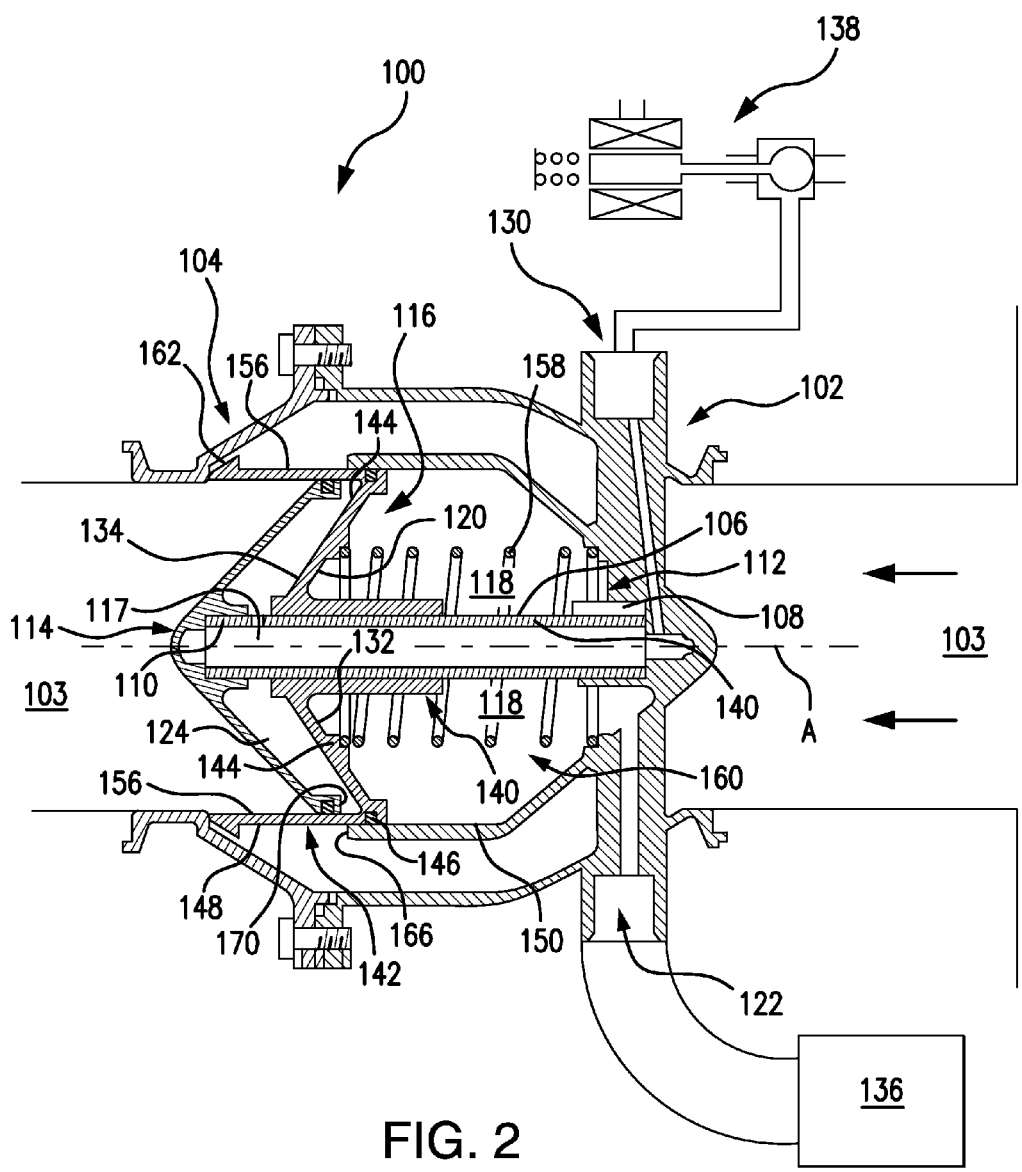
FIG. 2 is a cross-sectional side elevation view of the bleed valve of FIG. 1, showing the full-area piston in a closed position.

With reference now to FIGS. 1 and 2, full-area piston 116 includes inner and outer sleeves, 140 and 142, respectively, and a conical portion 144 connecting therebetween. Conical portion 144 converges in a downstream direction, e.g. toward the left side of valve 100 as depicted in FIGS. 1 and 2. First pressure chamber 118, e.g. the intermediate-pressure chamber, is defined between an upstream side 120 of piston 116 and inner diameter portion 112 of inlet housing 102 and is in fluid communication with an intermediate-pressure port 122. Valve 100 includes a spring 158 positioned in an interior 160 of first pressure chamber 118. Spring 158 is incorporated to provide a fail-safe position for piston 116.

The area of an upstream surface 132 of piston 116 at an angle with respect to valve axis A, is in fluid communication with first pressure chamber 118, and is substantially equal to the area of a downstream surface 134 of piston 116. Downstream surface 134 of piston 116 is also at an angle with respect to valve axis A and is in fluid communication with a second pressure chamber 124, described below. The substantial equality between the areas of the upstream and downstream surfaces 132 and 134, respectively, allow for a uniform and substantially symmetrical full-area piston configuration.

Those skilled in the art will readily appreciate that the full-area piston configuration described above provides a more light weight, compact and controllable bleed valve, as compared with a half-area piston configuration, that reliably operates at elevated temperature and pressure. Additionally, the symmetric configuration found in full-area piston 116 provides an optimum configuration for high vibration environment over traditional half-area bleed valves that tend to include asymmetries and have a cantilevered configuration.

With continued reference to FIGS. 1 and 2, outer sleeve 142 of piston 116 includes a high-pressure seal ring 146 at the interface between an outer diameter surface 148 of outer sleeve 142 of piston 116 and an inner diameter surface 150 of inlet housing 102. End cap 114 includes a seal ring 152 at the interface between an outer diameter surface 154 of end cap 114 and an inner diameter surface 156 of outer sleeve 142 of piston 116. High-pressure seal ring 146 and seal ring 152 both act to eliminate internal leakage from a high-pressure bleed duct 103. Seal ring 152 prevents leakage into the opening chamber, e.g. the solenoid pressure chamber 124. This tends to ensure that the pressure of the solenoid pressure chamber 124 will be ambient when the valve is commanded closed. Seal ring 146 minimizes leakage of high-pressure air to first pressure chamber 118, e.g. the intermediate pressure chamber. Additionally, bleed valve 100 does not include any external leakage of high-pressure fluid from high-pressure seal ring 146 to first pressure chamber 118. This lack of external leakage creates an overall more efficient bleed valve 100, as compared to half-area designs, where leakage of high-pressure fluid into an ambient chamber is wasted.

As shown in FIGS. 1 and 2, second pressure chamber 124, e.g. a solenoid pressure chamber, is defined between a downstream side 126 of piston 116 and end cap 114 of outlet housing 104 and is in fluid communication with a solenoid pressure port 130 through shaft passage 117. Intermediate-pressure port 122 is configured to connect to an intermediate-pressure source 136. Solenoid pressure port 130 is configured to connect to a solenoid pressure valve 138 that controls the pressure in second pressure chamber 124. The intermediate pressure of first pressure chamber 118 acts to drive piston 116 into the closed position and the solenoid pressure of second pressure chamber 124 acts to drive piston 116 into the open position when solenoid pressure valve 138 is energized.

In an open position, a conical end portion 162 of outer sleeve 142 of piston 116 forms a substantially conical surface 164 in conjunction with end cap 114. A downstream side 166 of an inner diameter portion 112 of inlet housing 102 is proximate to an upstream side 170 of end cap 114. The proximity of downstream side 166 and upstream side 170 is possible due to the smaller and more compact structure of piston 116, resulting in a smaller overall valve envelope.

Figure 3:
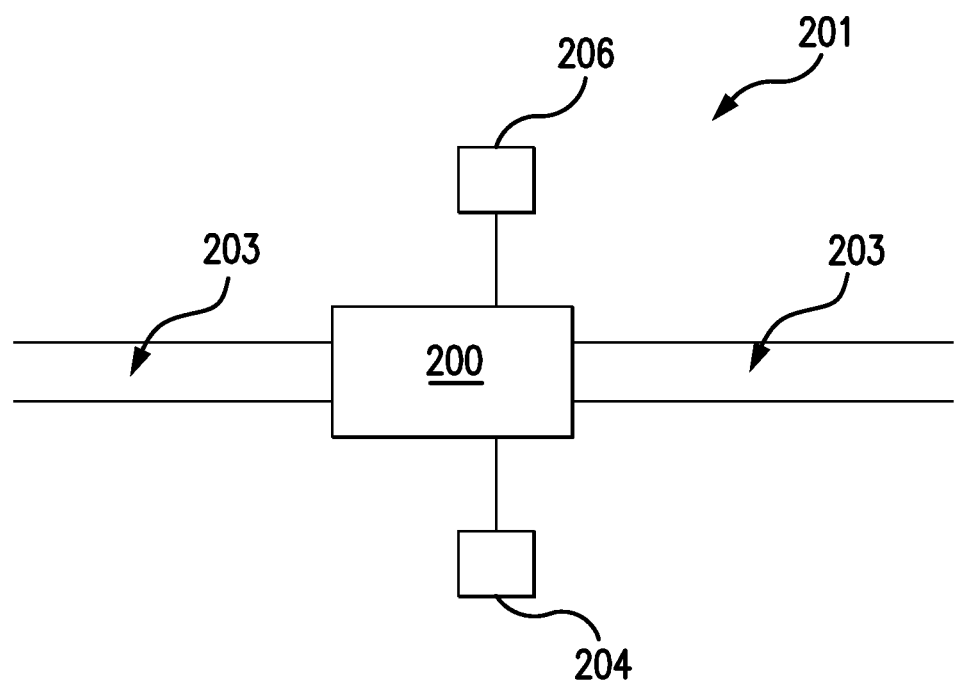
FIG. 3 is schematic depiction of an exemplary embodiment of a high-pressure bleed valve system constructed in accordance with the present disclosure, showing the bleed valve of FIG. 1 mounted within a high-pressure bleed duct of a gas turbine engine.

A shown in FIG. 3, a high-pressure bleed valve system 200 for a gas turbine engine includes a valve 200, similar to valve 100, mounted within a high-pressure bleed duct 203 of a gas turbine engine. System 200 includes a solenoid pressure valve 206 and an intermediate-pressure source 204. Solenoid pressure valve 206 is in fluid communication with the solenoid pressure chamber, e.g. second pressure chamber 124, for controlling the pressure in solenoid pressure chamber 124. Intermediate-pressure source 204 is in fluid communication with the intermediate-pressure chamber, e.g. first pressure chamber 118. It is contemplated that intermediate-pressure source 204 can be from an intermediate stage of the compressor, for example, a stage from the low-pressure compressor.

A method for controlling pressure within a gas turbine compressor stage includes moving a piston, e.g. piston 116, into an open position such that high-pressure fluid is free to flow through a housing body, e.g. inlet and outlet housings 102 and 104, respectively, and supplying intermediate-pressure fluid to a first fluid chamber, e.g. first chamber 118. The first fluid chamber is in fluid communication with an upstream surface, e.g. upstream surface 132, of the piston, thereby moving the piston into a closed position.

By utilizing higher-pressure fluid from intermediate compressor stages, there is less wear on the closing ring, e.g. high-pressure seal ring 146, because of the lower pressure differential between the fluid from the low-pressure compressor stages and the high-pressure fluid from the high-pressure compressor stages, as compared to the wear on the closing ring of the traditional half-area bleed valves where the pressure differential between ambient fluid and the high-pressure compressor fluid is much greater.

The method also includes supplying fluid pressure from a solenoid pressure valve, e.g. solenoid pressure valve 206, when the solenoid pressure valve is energized, into a second fluid chamber, e.g. second fluid chamber 124, in fluid communication with a downstream surface, e.g. downstream surface 134, of piston, thereby moving said piston into an open position. The method includes passing high-pressure fluid through the housing body while piston 116 is in the open position for a desired time and removing fluid pressure from the second fluid chamber, e.g. when the solenoid valve is de-energized, thereby causing a force imbalance between the upstream and downstream surfaces allowing the piston to return to the closed position.

The methods and systems of the present disclosure, as described above and shown in the drawings, provide light weight, compact and controllable bleed valves that can operate at high temperatures and pressures. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A bleed valve for a turbomachine comprising:
   an inlet housing;
   an outlet housing downstream of the inlet housing;
   a hollow shaft defining a valve axis having a first end mounted to an inner diameter portion of the inlet housing and a second end mounted to an end cap of the outlet housing, wherein a radial gap is defined around the entire periphery of the end cap between an outer diameter surface of the end cap and a portion of the outlet housing;
   a full-area piston slidably mounted to the shaft between the inlet housing and the end cap for movement between an open and a closed position;
   a first pressure chamber defined between an upstream side of the piston and the inner diameter portion of the inlet housing in fluid communication with an intermediate-pressure port; and
   a second pressure chamber defined between a downstream side of the piston and the end cap in fluid communication with a solenoid pressure port, wherein the solenoid pressure port is configured to connect to a solenoid pressure valve that controls the pressure in the second pressure chamber, wherein an area of an upstream surface of the piston at an angle with respect to the valve axis and in fluid communication with the first pressure chamber is substantially equal to an area of a downstream surface of the piston at an angle with respect to the valve axis and in fluid communication with the second pressure chamber.

2. A bleed valve as recited in claim 1, wherein the intermediate-pressure port is configured to connect to an intermediate-pressure source.

3. A bleed valve as recited in claim 1, wherein an intermediate pressure of the first pressure chamber is for driving the piston into the closed position and a solenoid pressure of the second pressure chamber is for driving the piston into the open position.

4. A bleed valve as recited in claim 1, wherein the piston includes inner and outer sleeves, and a conical portion connecting therebetween, wherein the conical portion converges in a downstream direction.

5. A bleed valve as recited in claim 4, wherein the outer sleeve of the piston includes a high-pressure seal ring at an interface between an outer diameter surface of the outer sleeve of the piston and an inner diameter surface of the inlet housing.

6. A bleed valve as recited in claim 4, wherein the end cap includes a seal ring at an interface between an outer diameter surface of the end cap and an inner diameter surface of the outer sleeve of the piston.

7. A bleed valve as recited in claim 1, further comprising a spring positioned in an interior of the first pressure chamber.

8. A bleed valve as recited in claim 1, wherein, in an open position, a conical end portion of an outer sleeve of the piston forms a substantially conical surface in conjunction with the end cap.

9. A bleed valve as recited in claim 1, wherein a downstream side of an inner diameter portion of the inlet housing is proximate to an upstream side of the end cap.

10. A bleed valve system for a gas turbine engine comprising:
    a valve mounted within a high-pressure bleed duct of the gas turbine engine, wherein the valve includes an intermediate-pressure chamber and a solenoid pressure chamber, wherein the valve includes an inlet housing and an outlet housing, wherein a downstream side of an inner diameter portion of the inlet housing is proximate to an upstream side of an end cap of the outlet housing, wherein a radial gap is defined around the entire periphery of the end cap between an outer diameter surface of the end cap and a portion of the outlet housing;
    a solenoid pressure valve in fluid communication with the solenoid pressure chamber for controlling the pressure in the solenoid pressure chamber; and
    an intermediate-pressure source in fluid communication with the intermediate-pressure chamber, wherein an intermediate pressure of the intermediate-pressure chamber is for driving a piston of the valve into a closed position and a solenoid pressure of the solenoid pressure chamber is for driving the piston into an open position.

11. A bleed valve system as recited in claim 10, wherein the intermediate-pressure source is an intermediate stage of the compressor.

12. A bleed valve for a turbomachine comprising:
    an inlet housing;
    an outlet housing downstream of the inlet housing;
    a hollow shaft defining a valve axis having a first end mounted to an inner diameter portion of the inlet housing and a second end mounted to an end cap of the outlet housing;
    a full-area piston slidably mounted to the shaft between the inlet housing and the end cap for movement between an open and a closed position, wherein the piston includes inner and outer sleeves, and a conical portion connecting therebetween, wherein the conical portion converges in a downstream direction;
    a first pressure chamber defined between an upstream side of the piston and the inner diameter portion of the inlet housing in fluid communication with an intermediate-pressure port; and
    a second pressure chamber defined between a downstream side of the piston and the end cap in fluid communication with a solenoid pressure port, wherein the solenoid pressure port is configured to connect to a solenoid pressure valve that controls the pressure in the second pressure chamber, wherein an area of an upstream surface of the piston at an angle with respect to the valve axis and in fluid communication with the first pressure chamber is substantially equal to an area of a downstream surface of the piston at an angle with respect to the valve axis and in fluid communication with the second pressure chamber, wherein an intermediate pressure of the first pressure chamber is for driving the piston into the closed position and a solenoid pressure of the second pressure chamber is for driving the piston into the open position.

13. A bleed valve as recited in claim 12, wherein the outer sleeve of the piston includes a high-pressure seal ring at an interface between an outer diameter surface of the outer sleeve of the piston and an inner diameter surface of the inlet housing.

14. A bleed valve for a turbomachine comprising:
an inlet housing;
an outlet housing downstream of the inlet housing;
a hollow shaft defining a valve axis having a first end mounted to an inner diameter portion of the inlet housing and a second end mounted to an end cap of the outlet housing;
a full-area piston slidably mounted to the shaft between the inlet housing and the end cap for movement between an open and a closed position, wherein the piston includes inner and outer sleeves, and a conical portion connecting therebetween, wherein the conical portion converges in a downstream direction;
a first pressure chamber defined between an upstream side of the piston and the inner diameter portion of the inlet housing in fluid communication with an intermediate-pressure port;
a spring positioned in an interior of the first pressure chamber; and
a second pressure chamber defined between a downstream side of the piston and the end cap in fluid communication with a solenoid pressure port, wherein the solenoid pressure port is configured to connect to a solenoid pressure valve that controls the pressure in the second pressure chamber, wherein an area of an upstream surface of the piston at an angle with respect to the valve axis and in fluid communication with the first pressure chamber is substantially equal to an area of a downstream surface of the piston at an angle with respect to the valve axis and in fluid communication with the second pressure chamber.

15. A bleed valve as recited in claim 14, wherein the outer sleeve of the piston includes a high-pressure seal ring at an interface between an outer diameter surface of the outer sleeve of the piston and an inner diameter surface of the inlet housing.

16. A bleed valve for a turbomachine comprising:
an inlet housing;
an outlet housing downstream of the inlet housing;
a hollow shaft defining a valve axis having a first end mounted to an inner diameter portion of the inlet housing and a second end mounted to an end cap of the outlet housing;
a full-area piston slidably mounted to the shaft between the inlet housing and the end cap for movement between an open and a closed position, wherein the piston includes inner and outer sleeves, and a conical portion connecting therebetween, wherein the conical portion converges in a downstream direction, and wherein, in an open position, the conical end portion of the outer sleeve of the piston forms a substantially conical surface in conjunction with the end cap;
a first pressure chamber defined between an upstream side of the piston and the inner diameter portion of the inlet housing in fluid communication with an intermediate-pressure port; and
a second pressure chamber defined between a downstream side of the piston and the end cap in fluid communication with a solenoid pressure port, wherein the solenoid pressure port is configured to connect to a solenoid pressure valve that controls the pressure in the second pressure chamber, wherein an area of an upstream surface of the piston at an angle with respect to the valve axis and in fluid communication with the first pressure chamber is substantially equal to an area of a downstream surface of the piston at an angle with respect to the valve axis and in fluid communication with the second pressure chamber.

17. A bleed valve as recited in claim 16, wherein the outer sleeve of the piston includes a high-pressure seal ring at an interface between an outer diameter surface of the outer sleeve of the piston and an inner diameter surface of the inlet housing.

* * * * *